2,930,735
Patented Mar. 29, 1960

2,930,735
ZIRCONIUM THERAPY IN IVY POISONING

Benzion Vogel, Mohegan Lake, N.Y.

No Drawing. Application March 14, 1955
Serial No. 494,290

8 Claims. (Cl. 167—58)

The present invention relates to novel compositions of matter containing zirconium salts and to the processes for preparation thereof.

It has recently been found that zirconium has the ability of combining with urushiol $C_6H_3(OH)_2C_{15}H_{27}$, the active substance of poison ivy, to form a complex which is physiologically inactive. In laboratory experiments, the complex of zirconium and urushiol when applied to the skin of individuals normally sensitive to poison ivy did not produce the vesicant action characteristic of ivy poisoning.

In the preparation of zirconium-containing compositions for the treatment of ivy poisoning certain problems were encountered. The zirconium salts of the compositions were insoluble and thus could not act upon the urushiol which had already penetrated into the skin. Moreover, the suspensions of the zirconium salts were unstable and the salts readily settled out. In addition, the salts were inactivated by saponification of the stearic acid and precipitation by KOH, both components of the ointment vehicle. Finally, the commercially available salts of zirconium were often impure and unsuited for the preparation of therapeutic compositions.

It is therefore an object of the present invention to prepare novel compositions containing zirconium salts which will not settle out of aqueous suspension over prolonger periods of time.

It is a further object of the invention to prepare zirconium salt compositions which can readily be suspended and re-suspended in aqueous media.

Another object of the invention is to prepare zirconium-containing compositions wherein the zirconium is present in a form such that it may penetrate the skin to act upon urushiol which has also penetrated the skin surface.

Still another object of the invention is to prepare zirconium-containing compositions of sufficient purity to permit their use for therapeutic application.

In accordance with the present invention it has been found that crude zirconium salts may be dissolved in acids and precipitated substantially quantitatively with water-soluble bicarbonates to form a flocculent mixture of hydrated zirconium carbonate and zirconium bicarbonate. This mixture may readily be suspended in water and, if upon long standing should settle out somewhat, may be easily re-suspended by slight shaking. The dissolution of the zirconium salt and the precipitation of the carbonate-bicarbonate mixture also serves to purify the zirconium component so that it is directly suited for use in therapeutic compositions.

Upon combination of the zirconium carbonate-bicarbonate salt with a limited amount, i.e., less than the stoichiometric amount, of an acid forming a soluble zirconium salt a composition is formed wherein the unconverted insoluble zirconium salt is suitable for saponification of the skin oils and wherein the solubilized zirconium salt is suitable for penetrating the skin and inactivating the urushiol through irreversible complex formation therewith.

Any crude zirconium salt can be dissolved initially in any suitable acid or mixtures of acids. Mineral acids are preferred for this purpose and the use of crude zirconium carbonate in conjunction with hydrochloric acid has proven especially useful. For precipitation of the zirconium there may be employed any bicarbonate which is more soluble than zirconium bicarbonate. Of the alkali metal bicarbonates, which are preferred, sodium bicarbonate is especially suitable.

The precipitate which forms is initially a hydrated zirconium bicarbonate but upon standing carbon dioxide is continuously liberated with the formation of zirconium carbonate admixed with the bicarbonate. The mixture of salts is so suspensible that it cannot be separated from the liquid by decanting but must be filtered and washed.

To the mixture of salts an acid is added in sufficient quantity to combine with about one-tenth of the zirconium oxide thereby producing a soluble zirconium salt of the acid in addition to the insoluble carbonate and bicarbonate. Any acid forming a water-soluble zirconium salt may be utilized for this purpose such as the mineral acids and organic acids such as acetic acid, lactic acid, and the like. Acetic acid is preferred, however, since it provides the maximum ratio factor of maceration-nonescharoticity-stability.

Water is added to the mixture of salts obtained, the quantity depending upon the ultimate concentration desired. For the treatment of ivy poisoning an aqueous composition assaying about 5% $ZrO_2$ is effective. For the preparation of dressings for topical application this solution may be diluted ten-fold with water.

A hygroscopic agent may be added to the composition to aid in retaining the water and thereby stabilizing the mass. About 2% of propylene glycol or glycerine is sufficient for this purpose.

The following example illustrates a preferred embodiment of the present invention.

Example 1

60 pounds of crude zirconium carbonate assaying 16% $ZrO_2$ are agitated in a tank together with 10 gallons of water and hydrochloric acid is added until the salt is dissolved. The solution is filtered to remove all undissolved impurities. A saturated solution of sodium bicarbonate is added to the zirconium salt solution with constant agitation. Using methyl orange as indicator, the addition of bicarbonate is continued until the first red coloration that lasts 15 seconds is produced. The flocculent precipitate formed is washed by filtration until free of chlorides and weights about 127 pounds, assaying 7½% $ZrO_2$ with the balance water and carbon dioxide. 1 pint of glacial acetic acid is added to the precipitate and agitated until effervescence is over. 4 pints of propylene glycol are added together with sufficient water to bring the overall weight to 200 lbs. The resulting composition comprises 1% zirconium acetate (diacetato-zirconylic acid) and 27% zirconium carbonate-bicarbonate. About ½% $ZrO_2$ is combined as the acetate and about 4½% $ZrO_2$ is tied up in the carbonate-bicarbonate salt, the composition in its entirety assaying about 5% $ZrO_2$.

Various changes and modifications may be made without departing from the spirit and scope of the present invention and it is intended that such obvious changes and modifications be embraced by the annexed claims.

I claim:

1. A composition of matter for application to the skin, comprising a mixture of zirconium carbonate, zirconium bicarbonate and zirconium acetate.

2. A composition of matter for application to the skin, comprising an aqueous suspension of flocculent zirconium carbonate and zirconium bicarbonate and zirconium acetate dissolved therein, including propylene glycol.

3. A composition of matter for application to the skin, comprising an aqueous suspension of flocculent zirconium carbonate and zirconium bicarbonate having zirconium acetate dissolved therein.

4. A composition of matter for application to the skin, comprising an aqueous suspension of flocculent zirconium carbonate and zirconium bicarbonate having zirconium acetate dissolved therein, said suspension assaying about 5% $ZrO_2$ and comprising about 1% zirconium acetate.

5. The process which comprises mixing a coprecipitated mixture of zirconium carbonate and zirconium bicarbonate with less than the stoichiometric amount of acetic acid and with water, whereby there is formed an aqueous suspension of zirconium carbonate and zirconium bicarbonate having zirconium acetate dissolved therein.

6. Process in accordance with claim 5, wherein the suspension assays about 5% $ZrO_2$ and comprises about 1% zirconium acetate.

7. The process which comprises dissolving crude zirconium carbonate in hydrochloric acid, adding sodium bicarbonate to said solution to precipitate a mixture of zirconium carbonate and zirconiu m bicarbonate, and combining said precipitate with water and with less than the stoichiometric amount of acetic acid, whereby there is formed an aqueous suspension of zirconium carbonate and zirconium bicarbonate having zirconium acetate dissolved therein.

8. Process in accordance with claim 7, wherein the suspension assays about 5% $ZrO_2$ and comprises about 1% zirconium acetate.

References Cited in the file of this patent

Blumenthal: Jour. of the Soc. of Cosmetic Chemists, vol. 4, No. 2, August 1953, pp. 69–75.